United States Patent
Chien et al.

(10) Patent No.: US 9,122,419 B2
(45) Date of Patent: Sep. 1, 2015

(54) DATA STORAGE UNIT WITH INTERNAL STORAGE AREA NETWORK SWITCH MODULE AND REDUNDANT DATA STORAGE SYSTEM INCLUDING SUCH DATA STORAGE UNIT

(71) Applicants: Hung-Ming Chien, Hsin-Chu (TW); Shen-Cheng Hsieh, Hsin-Chu (TW)

(72) Inventors: Hung-Ming Chien, Hsin-Chu (TW); Shen-Cheng Hsieh, Hsin-Chu (TW)

(73) Assignee: Promise Technology, Inc., Hsin-Chu (TW)

( * ) Notice: Subject to any disclaimer, the term of this patent is extended or adjusted under 35 U.S.C. 154(b) by 102 days.

(21) Appl. No.: 14/145,415

(22) Filed: Dec. 31, 2013

(65) Prior Publication Data
US 2015/0089131 A1    Mar. 26, 2015

(30) Foreign Application Priority Data
Sep. 23, 2013  (TW) .............................. 102134247 A (51) Int. Cl.
*G06F 3/06* (2006.01)
(52) U.S. Cl.
CPC .............. *G06F 3/067* (2013.01); *G06F 3/0619* (2013.01); *G06F 3/0665* (2013.01)
(58) Field of Classification Search
CPC ...... G06F 3/067; G06F 3/0619; G06F 3/0665

USPC ............ 711/114, 112, 154, 156; 714/6.2, 6.3, 714/6.32
See application file for complete search history.

(56) References Cited

U.S. PATENT DOCUMENTS

| | | | |
|---|---|---|---|
| 7,383,384 B2 * | 6/2008 | Chien et al. .................... | 711/114 |
| 8,230,170 B2 * | 7/2012 | Chien et al. .................... | 711/114 |
| 8,954,787 B2 * | 2/2015 | Gladwin et al. ................ | 714/4.2 |
| 8,996,910 B2 * | 3/2015 | Gladwin et al. ............. | 714/6.32 |
| 2008/0040463 A1 * | 2/2008 | Brown et al. .................. | 709/223 |
| 2011/0238910 A1 * | 9/2011 | Wang et al. .................... | 711/114 |
| 2011/0276759 A1 * | 11/2011 | Chien et al. .................... | 711/114 |
| 2012/0131275 A1 * | 5/2012 | Huang et al. ................... | 711/114 |
| 2012/0290877 A1 * | 11/2012 | Grube et al. .................... | 714/15 |
| 2013/0182708 A1 * | 7/2013 | Sharma et al. ................ | 370/392 |

* cited by examiner

*Primary Examiner* — Stephen Elmore
(74) *Attorney, Agent, or Firm* — Christensen Fonder P.A.

(57) ABSTRACT

The invention discloses a data storage unit and a redundant data storage system including such data storage unit. The data storage unit of the invention includes an internal storage area network (SAN) switch module, a storage server module and a storage device. The internal SAN switch module includes a first external transmission interface and a first internal transmission interface. The storage server module includes a second external transmission interface and a second internal transmission interface. The storage server module is respectively connected to the storage device and the first internal transmission interface through the second internal transmission interface. The internal SAN switch module is connected to the storage device through the first internal transmission interface.

13 Claims, 4 Drawing Sheets

DATA STORAGE UNIT WITH INTERNAL STORAGE AREA NETWORK SWITCH MODULE AND REDUNDANT DATA STORAGE SYSTEM INCLUDING SUCH DATA STORAGE UNIT

CROSS-REFERENCE TO RELATED APPLICATION

This utility application claims priority to Taiwan Application Serial Number 102134247, filed Sep. 23, 2013, which is incorporated herein by reference.

BACKGROUND OF THE INVENTION

1. Field of the Invention

The invention relates to a data storage unit and a redundant data storage system including such data storage unit. Moreover, in particular, the data storage unit according to the invention includes an internal storage area network (SAN) switch module, and the redundant data storage system according to the invention has simplified architecture, occupies less space, and significantly reduces installation cost thereof.

2. Description of the Prior Art

Current organizations, such as enterprises and so on, all demands redundant data storage systems to store and recover data. The redundant data storage system as demanded should consider current scale of the organization and its expansibility as the scale of the organization increasing in the future.

Figure 1:
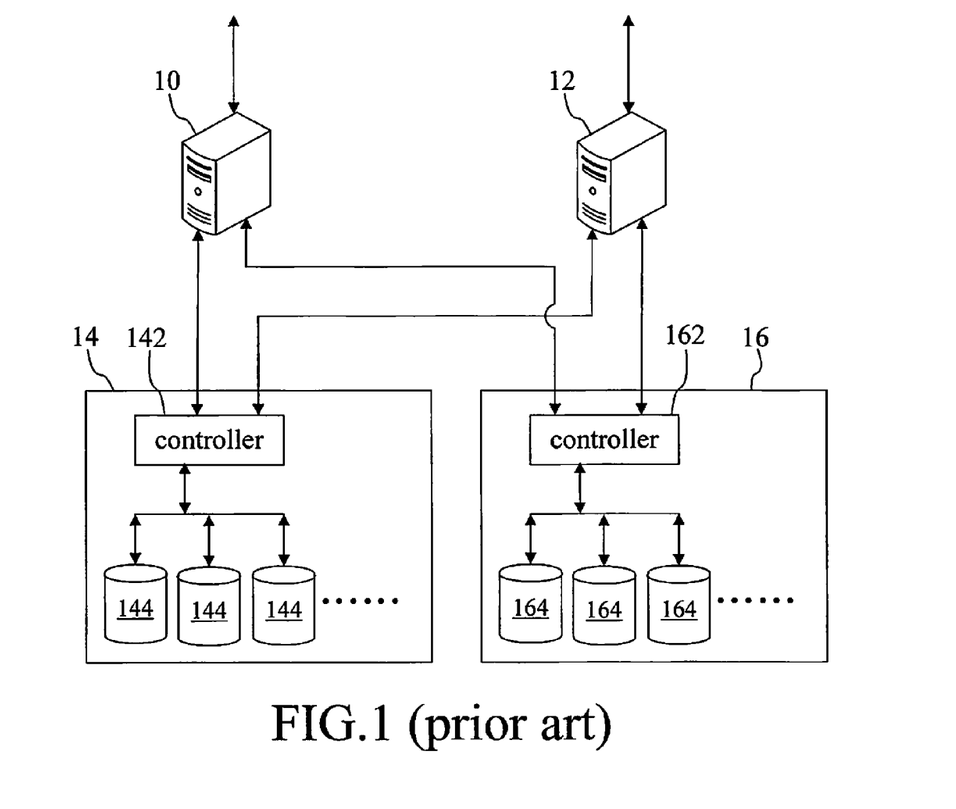
FIG. 1 is a schematic diagram showing the architecture of a redundant data storage system of prior arts.

Referring to FIG. 1, the architecture of a redundant data storage system 1 of the invention is illustratively shown in FIG. 1.

As shown in FIG. 1, the redundant data storage system 1 of the prior art includes a server 10, a server 12, a storage apparatus 14 and a storage apparatus 16. The server 10 and the server 12 both are connected to an intranet of an organization. The server 10 is respectively connected to the storage apparatus 14 and the storage apparatus 16. The server 12 is respectively connected to the storage apparatus 14 and the storage apparatus 16.

The storage apparatus 14 includes a controller 142 and a plurality of storage devices 144. The controller 142 is respectively connected to the plurality of storage devices 144. Similarly, the storage apparatus 16 includes a controller 162 and a plurality of storage devices 164. The controller 162 is connected to the plurality of storage devices 164. The plurality of storage devices 144 and the plurality of storage devices 164 can be respectively specified in a RAID architecture such as RAID 0, RAID 1, RAID 2, RAID 3, RAID 4, RAID 5, RAID 6, and so on, or specified in a JBOD (Just a Bunch Of Disks) architecture.

Under normal condition, the instructions of requirement of accessing data in the storage apparatus 14 are received and executed by the server 10. The instructions of requirement of accessing data in the storage apparatus 16 are received and executed by the server 12.

If the server 10 fails, the server 12 receives and executes the instructions of requirement of accessing data in the storage apparatus 14. If the server 12 fails, the server 10 receives and executes the instructions of requirement of accessing data in the storage apparatus 16. Thereby, the redundant data storage system 1 of the prior art can achieve the aim of data recovery.

However, each of the server 10, the server 12, the storage apparatus 14 and the storage apparatus 16 of the redundant data storage system 1 of the prior art is a stand-alone equipment which needs an individual housing, and individual power supply, an individual fan and other dissipating devices. Therefore, the redundant data storage system 1 of the prior art dose not only occupy much space, but also needs much installation cost.

In addition, if the redundant data storage system 1 of the prior art expands more servers and storage apparatuses, the redundant data storage system 1 even needs an external storage area network switch which has complicated architecture and costs expensively. The servers of the redundant data storage system 1 are connected to the storage apparatuses through the external storage area network switch. Obviously, this way significantly increases installation and needs much more space for the redundant data storage system 1 of the prior art.

SUMMARY OF THE INVENTION

Accordingly, one scope of the invention is to provide a data storage unit, whose architecture different from those of the prior art, and a redundant data storage system including such data storage unit.

A data storage unit according to a preferred embodiment of the invention includes an internal SAN switch module, a storage server module and a storage device. The internal SAN switch module includes a first external transmission interface and a first internal transmission interface. The first external transmission interface provides connection for at least one external apparatus. The storage server module includes a second external transmission interface and a second internal transmission interface. The second external transmission interface provides connection for the at least one apparatus. The storage server module is respectively connected to the storage device and the first internal transmission interface through the second internal transmission interface. The internal SAN switch module is connected to the storage device through the first internal transmission interface.

In one embodiment, each of the first external transmission interface and the second external transmission interface can be a fibre channel (FC) interface, a small computer system interface (SCSI), a serial SCSI (SAS), a serial advanced technology attachment (SATA) interface, a peripheral component interconnect express (PCIe) interface, a giga-Ethernet interface, a parallel advanced technology attachment (PATA) interface, an InfiniBand interface, or other high speed transmission interface.

In one embodiment, each of the first internal transmission interface and the second internal transmission interface can be the FC interface, the SCSI, the SAS, the SATA interface, the PCIe interface, the giga-Ethernet interface, the PATA interface, the InfiniBand interface, or other high speed transmission interface.

A redundant data storage system according to a preferred embodiment of the invention includes a first data storage unit and a second data storage unit. The first data storage unit includes a first internal SAN switch module, a first storage server module and a first storage device. The first internal SAN switch module includes a first external transmission interface and a first internal transmission interface. The first storage server module includes a second external transmission interface and a second internal transmission interface. The first storage server module is respectively connected to the first storage device and the first internal transmission interface through the second internal transmission interface. The first internal SAN switch module is connected to the first storage device through the first internal transmission interface. The second data storage unit includes a second internal SAN switch module, a second storage server module and a second storage device. The second internal SAN switch module includes a third external transmission interface and a third internal transmission interface. The second storage server module includes a fourth external transmission interface and a fourth internal transmission interface. The second storage server module is respectively connected to the second storage device and the third internal transmission interface through the fourth internal transmission interface. The second internal SAN switch module is connected to the second storage device through the third internal transmission interface. The second internal SAN switch module is connected to the second external transmission interface through the third external transmission interface. The second storage server module is connected to the first external transmission interface through the fourth external transmission interface.

Further, the redundant data storage system according the preferred embodiment of the invention also includes third data storage unit. The third data storage unit includes a third internal SAN switch module, a third storage server module and a third storage device. The third internal SAN switch module includes a fifth external transmission interface and a fifth internal transmission interface. The third storage server module includes a sixth external transmission interface and a sixth internal transmission interface. The third storage server module is respectively connected to the third storage device and the fifth internal transmission interface through the sixth internal transmission interface. The third internal SAN switch module is connected to the third storage device through the fifth internal transmission interface. The third internal SAN switch module is respectively connected to the second external transmission interface and the fourth external transmission interface through the fifth external transmission interface. The third storage server module is respectively connected to the first external transmission interface and the third external transmission interface through the sixth external transmission interface.

Further, the redundant data storage system according to the preferred embodiment of the invention also includes a fourth data storage unit and a fifth data storage unit. The fourth data storage unit includes a fourth internal SAN switch module, a fifth internal SAN switch module, a fourth storage device and a fifth storage device. The fourth internal SAN switch module includes a seventh external transmission interface and a seventh internal transmission interface. The fifth internal SAN switch module includes an eighth external transmission interface and an eighth internal transmission interface. The fourth internal SAN switch module is respectively connected to the fourth storage device, the fifth storage device and the eighth internal transmission interface through the seventh internal transmission interface, and is connected to the first external transmission interface through the seventh external transmission interface. The fifth internal
SAN switch module is respectively connected to the fourth storage device and the fifth storage device through the eighth internal transmission interface, and is connected to the second external transmission interface through the eighth external transmission interface. The fifth data storage unit includes a sixth internal SAN switch module, a seventh internal SAN switch module, a sixth storage device and a seventh storage device. The sixth internal SAN switch module includes a ninth external transmission interface and a ninth internal transmission interface. The seventh internal SAN switch module includes a tenth external transmission interface and a tenth internal transmission interface. The sixth internal SAN switch module is respectively connected to the sixth storage device, the seventh storage device and the tenth internal transmission interface through the ninth internal transmission interface, and is connected to the third external transmission interface through the ninth external transmission interface. The seventh internal SAN switch module is respectively connected to the sixth storage device and the seventh storage device through the tenth internal transmission interface, and is connected to the fourth external transmission interface through the tenth external transmission interface.

Compared to the prior art, the redundant data storage system of the invention has simplified architecture, occupies less space, significantly reduces installation cost thereof, and has much expansibility.

The advantage and spirit of the invention may be understood by the following recitations together with the appended drawings.

DETAILED DESCRIPTION OF THE INVENTION

Figure 2:
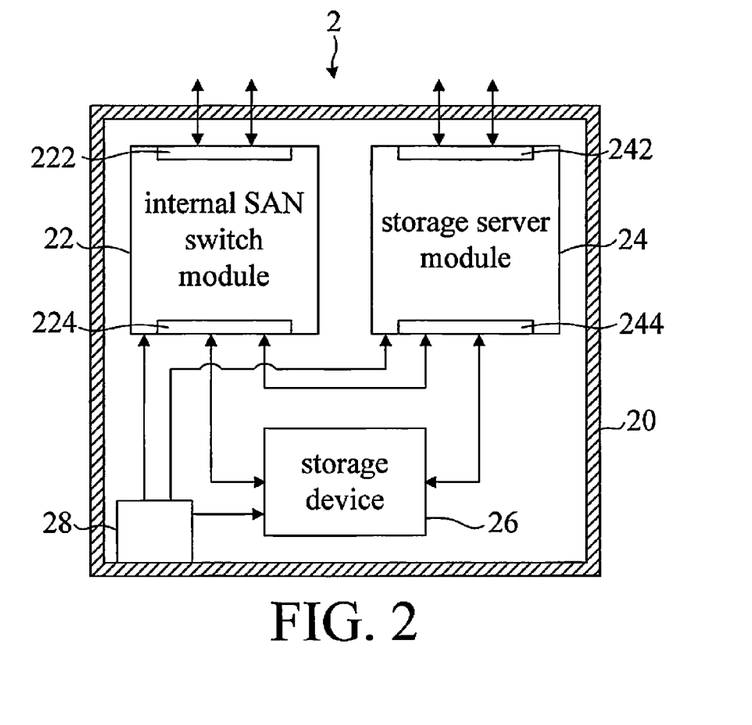
FIG. 2 is a schematic diagram showing the architecture of a data storage unit according to a preferred embodiment of the invention.
Figure 3:
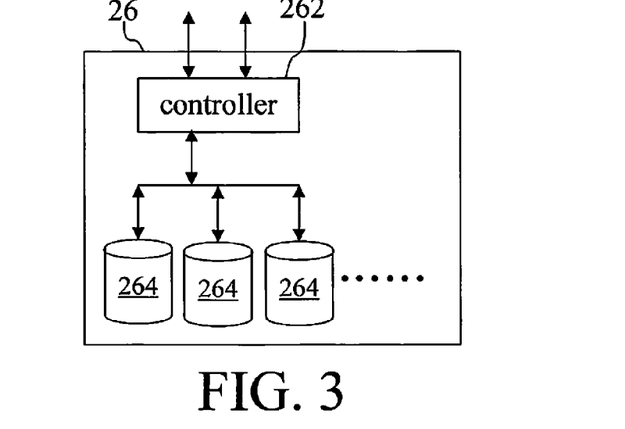
FIG. 3 is a schematic diagram showing the architecture of a storage device g the data storage unit according to the preferred embodiment of the invention.

Referring to FIGS. 2 and 3, the architecture of a data storage unit 2 according to a preferred embodiment of the invention is illustratively shown in FIG. 2. The architecture of a storage device 26 of the data storage unit 2 according to the preferred embodiment of the invention is illustratively shown in FIG. 3.

As shown in FIG. 2, the data storage unit 2 of the invention includes an internal SAN switch module 22, a storage server module 24 and a storage device 26.

The internal SAN switch module 22 includes a first external transmission interface 222 and a first internal transmission interface 224. The first external transmission interface 222 provides connection for at least one external apparatus such as another storage unit.

The storage server module 24 includes a second external transmission interface 242 and a second internal transmission interface 244. The second external transmission interface 242 provides connection for at least one external apparatus such as another storage unit. The storage server module 24 is respectively connected to the storage device 26 and the first internal transmission interface 224 through the second internal transmission interface 244. The internal SAN switch module 22 is connected to the storage device 26 through the first internal transmission interface 224.

As shown in FIG. 3, the storage device 26 includes a controller 262 and a plurality of storage devices 264. The controller 262 is connected to the plurality of storage devices 264. The plurality of storage devices can be specified in a RAID architecture such as RAID 0, RAID 1, RAID 2, RAID 3, RAID 4, RAID 5, RAID 6, and so on, or specified in a JBOD (Just a Bunch Of Disks) architecture. The storage device 26 also includes a transmission interface (not illustrated in FIGS. 2 and 3) which provides connection for the internal SAN switch module 22 and the storage server module 24.

In one embodiment, each of the storage devices 264 can be a tape drive, a disk drive, a memory device, an optical storage drive, a sector corresponding to a single read-write head in the same disk drive, or other equivalent storage device.

In one embodiment, each of the first external transmission interface 222 and the second external transmission interface 242 can be the FC interface, the SCSI, the SAS, the SATA interface, the PCIe interface, the giga-Ethernet interface, the PATA interface, the InfiniBand interface, or other high speed transmission interface.

In one embodiment, each of the first internal transmission interface 224 and the second internal transmission interface 244 can be the FC interface, the SCSI, the SAS, the SATA interface, the PCIe interface, the giga-Ethernet interface, the PATA interface, the InfiniBand interface, or other high speed transmission interface.

In one embodiment, the internal SAN switch module 22 can be implemented into, but not limited to, an extension circuit board. The storage server module 24 can be implemented into, but not limited to, a main circuit board. Thereby, the architecture of the data storage unit 2 of the invention can be simplified, and the space occupied by the data storage unit 2 of the invention can be significantly reduced.

Further, also shown in FIG. 2, the data storage unit 2 of the invention also includes a housing 20 and a power supply 28. The power supply 28 is installed in the housing 20, and the internal SAN switch module 22, the storage server module 24 and the storage device 26 all are installed in the housing 20, too. The power supply 28 is respectively connected to the internal SAN switch module 22, the storage server module 24 and the storage device 26. The power supply 28 supplies electric power to the internal SAN switch module 22, the storage server module 24 and the storage device 26. Thereby, the data storage unit 2 of the invention can significantly reduce the space occupied thereof. Further, the data storage unit 2 of the invention also includes a fan and other dissipating devices (not illustrated in FIG. 2) which are installed on the housing 20 and dissipates heat generated by the data storage unit 2 of the invention during operation. Distinguishable from the prior arts, 本發明之 the data storage unit 2 of the invention installs the internal SAN switch module 22, the storage server module 24 and the storage device 26 in the same equipment rather than different equipment individually.

The internal SAN switch module 22 detects a first status relative to the storage server module 24. Similarly, the storage server module 24 detects a second status relative to the internal SAN switch module 22.

If the first status indicates that the storage server module 24 operates normally, the storage server module 24 is in charge of executing access of data on the storage device 26. If the first status indicates that the storage server module 24 fails, the internal SAN switch module 22 allows that an external storage server module of the at least one external apparatus, connected to the internal SAN switch module 22, accesses data in the storage device 26 through the internal SAN switch module 22. By these procedures, the data storage unit 2 of the invention can have capability of failover in data recovery.

When the failed storage server module 24 is repaired or replaced by a workable storage server module 24, the repaired or replaced storage server module 24 communicates with the internal SAN switch module 22 and the external storage server module to retrieve dominance of accessing data in the storage device 26. By these procedures, the data storage unit 2 of the invention can have capability of fail back in data recovery.

Figure 4:
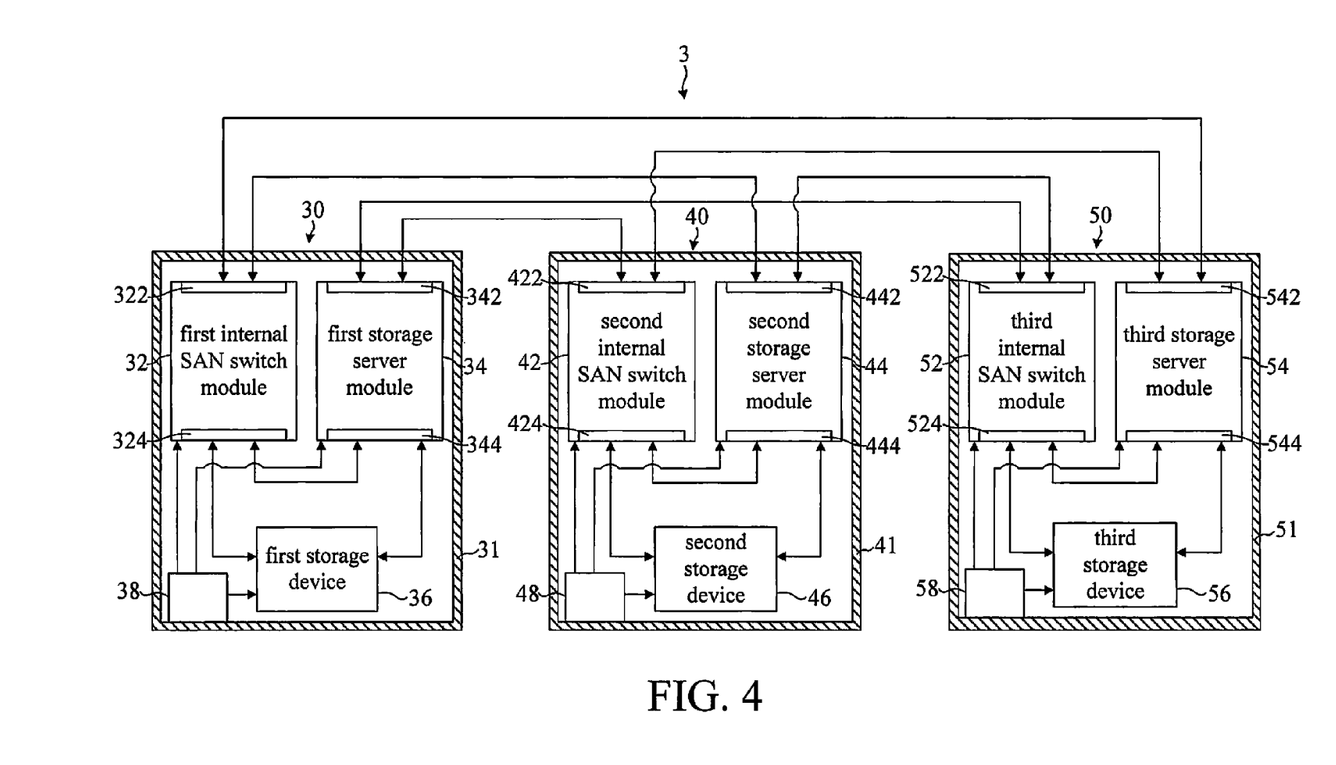
FIG. 4 is a schematic diagram showing the architecture of a redundant data storage system according to a preferred embodiment of the invention.

Referring to FIG. 4, the architecture of a redundant data storage system 3 according to a preferred embodiment of the invention is illustratively shown in FIG. 4.

As shown in FIG. 4, the redundant data storage system 3 of the invention includes a first data storage unit 30 and a second data storage unit 40. The first data storage unit 30 includes a first internal SAN switch module 32, a first storage server module 34 and a first storage device 36. The first internal SAN switch module 32 includes a first external transmission interface 322 and a first internal transmission interface 324. The first storage server module 34 includes a second external transmission interface 342 and a second internal transmission interface 344.

The first storage server module 34 is respectively connected to the first storage device 36 and the first internal transmission interface 324 through the second internal transmission interface 344. The first internal SAN switch module 32 is connected to the first storage device 36 through the first internal transmission interface 324.

The second data storage unit 40 includes a second internal SAN switch module 42, a second storage server module 44 and a second storage device 46. The second internal SAN switch module 42 includes a third external transmission interface 422 and a third internal transmission interface 424. The second storage server module 44 includes a fourth external transmission interface 442 and a fourth internal transmission interface 444. The second storage server module 44 is respectively connected to the second storage device 46 and the third internal transmission interface 424 through the fourth internal transmission interface 444. The second internal SAN switch module 42 is connected to the second storage device 46 through the third internal transmission interface 424. The second internal SAN switch module 42 is connected to the second external transmission interface 342 through the third external transmission interface 422. The second storage server module 44 is connected to the first external transmission interface 322 through the fourth external transmission interface 442.

Further, also shown in FIG. 4, the redundant data storage system 3 of the invention also includes a third data storage unit 50. The third data storage unit 50 includes a third internal SAN switch module 52, a third storage server module 54 and a third storage device 56. The third internal SAN switch module 52 includes a fifth external transmission interface 522 and a fifth internal transmission interface 524. The third storage server module 54 includes a sixth external transmission interface 542 and a sixth internal transmission interface 544.

The third storage server module 54 is respectively connected to the third storage device 56 and the fifth internal transmission interface 524 through the sixth internal transmission interface 544. The third internal SAN switch module 52 is connected to the third storage device 56 through the fifth internal transmission interface 524. The third internal SAN switch module 52 is respectively connected to the second external transmission interface 342 and the fourth external transmission interface 442 through the fifth external transmission interface 522. The third storage server module 54 is respectively connected to the first external transmission interface 322 and the third external transmission interface 422 through the sixth external transmission interface 542.

The first data storage unit 30, the second data storage unit 40 and the third data storage unit 50 have the architecture identical to that of the data storage unit 2, and will not be described in detail herein. The first storage device 36, the second storage device 46 and the third storage device 56 have the architecture identical to that of the storage device 26, and will not be described in detail herein.

Only to illustrate simply, in FIG. 4, three data storage unit (30, 40 and 50) are illustrated for the redundant data storage system 3 of the invention. The number of the data storage units in the redundant data storage system 3 of the invention must be considered as demanded, and the data storage units in the redundant data storage system 3 of the invention must be connected to one another easily. Therefore, the redundant data storage system 3 of the invention has much expansibility. It is emphasized that the redundant data storage system 3 of the invention has no need of the external storage area network switch of the prior art. Obviously, the redundant data storage system 3 of the invention significantly reduces installation cost thereof.

In one embodiment, each of the first external transmission interface 322, the second external transmission interface 342, the third external transmission interface 422, the fourth external transmission interface 442, the fifth external transmission interface 522 and the sixth external transmission interface 542 can be the FC interface, the SCSI, the SAS, the SATA interface, the PCIe interface, the giga-Ethernet interface, the PATA interface, the InfiniBand interface, or other high speed transmission interface.

In one embodiment, each of the first internal transmission interface 324, the second internal transmission interface 344, the third internal transmission interface 424, the fourth internal transmission interface 444, the fifth internal transmission interface 524 and the sixth internal transmission interface 544 can be the FC interface, the SCSI, the SAS, the SATA interface, the PCIe interface, the giga-Ethernet interface, the PATA interface, the InfmiBand interface, or other high speed transmission interface.

In one embodiment, each of the first internal SAN switch module 32, the second internal SAN switch module 42 and the third internal SAN switch module 52 can be implemented into, but not limited to, an expansion circuit board. Each of the first storage server module 34, the second storage server module 44 and the third storage server module 54 can be implemented into, but not limited to, a main circuit board. Thereby, the first data storage unit 30, the second data storage unit 40 and the third data storage unit 50 all simplify the architecture thereof, and reduce the space occupied thereof. Compared to the prior arts, the redundant data storage system 3 of the invention significantly reduces installation cost thereof.

Further, also shown in FIG. 4, the first data storage unit 30 also includes a first housing 31 and a first power supply 38. The first power supply 38 is installed in the first housing 31, and the first internal SAN switch module 32, the first storage server module 34 and the first storage device 36 all are installed in the first housing 31, too. The first power supply 38 is respectively connected to the first internal SAN switch module 32, the first storage server module 34 and the first storage device 36. The first power supply 38 supplies electric power to the first internal SAN switch module 32, the first storage server module 34 and the first storage device 36. Thereby, the first data storage unit of the invention 30 can significantly reduce the space occupied thereof. Further, the first data storage unit 30 of the invention also includes a fan and other dissipating devices (not illustrated in FIG. 4) which are installed on the first housing 31 and dissipate heat generated by the first data storage unit 30 of the invention during operation.

The second data storage unit 40 also includes a second housing 41 and a second power supply 48. The second power supply 48 is installed in the second housing 41, and the second internal SAN switch module 42, the second storage server module 44 and the second storage device 46 all installed in the second housing 41, too. The second power supply 48 is respectively connected to the second internal SAN switch module 42, the second storage server module 44 and the second storage device 46. The second power supply 48 supplies electric power to the second internal SAN switch module 42, the second storage server module 44 and the second storage device 46. Thereby, the second data storage unit 40 of the invention can significantly reduce the space occupied thereof. Further, the second data storage unit 40 of the invention also includes a fan and other dissipating devices (not illustrated in FIG. 4) which are installed on the second housing 41 and dissipate heat generated by the second data storage unit 40 of the invention during operation.

The third data storage unit 50 also includes a third housing 51 and a third power supply 58. The third power supply 58 is installed in the third housing 51, and the third internal SAN switch module 51, the third storage server module 54 and the third storage device 56 are installed in the third housing 51 too. The third power supply 58 is respectively connected to the third internal SAN switch module 52, the third storage server module 54 and the third storage device 56. The third power supply 58 supplies electric power to the third internal SAN switch module 52, the third storage server module 54 and the third storage device 56. Thereby, the third data storage unit 50 of the invention can significantly reduce the space occupied thereof. Further, the third data storage unit 50 of the invention also includes a fan and other dissipating devices (not illustrated in FIG. 4) which are installed on the third housing 51 and dissipate heat generated by the third data storage unit 50 of the invention during operation.

Figure 5:
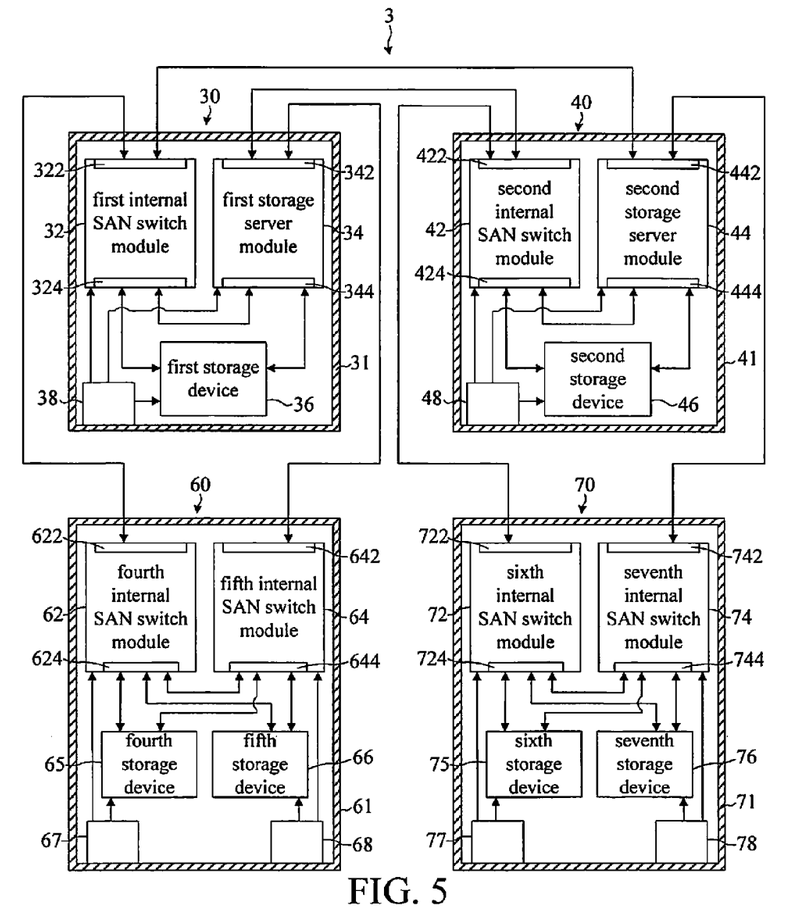
FIG. 5 is a schematic diagram showing the architecture of a modification of the redundant data storage system of the invention.

Referring to FIG. 5, the architecture of a modification of the redundant data storage system 3 of the invention is illustratively shown in FIG. 5. To illustrate simply, in FIG. 5, the redundant data storage system 3 of the invention includes a first data storage unit 30 and a second data storage unit 40. The components and devices in FIG. 5 identical to those shown in FIG. 4 are given the same numerical notations, and will be not described in detail herein.

Further, the redundant data storage system 3 of the invention also includes a fourth data storage unit 60 and a fifth data storage unit 70. The fourth data storage unit 60 includes a fourth internal SAN switch module 62, a fifth internal SAN switch module 64, a fourth storage device 65 and a fifth storage device 66. The fourth internal SAN switch module 62 includes a seventh external transmission interface 622 and a seventh internal transmission interface 624. The fifth internal SAN switch module 64 includes an eighth external transmission interface 642 and an eighth internal transmission interface 644.

The fourth internal SAN switch module 62 is respectively connected to the fourth storage device 65, the fifth storage device 66 and the eighth internal transmission interface 644 through the seventh internal transmission interface 624, and is connected to the first external transmission interface 322 through the seventh external transmission interface 622. The fifth internal SAN switch module 64 is respectively connected to the fourth storage device 65 and the fifth storage device 66 through the eighth internal transmission interface 644, and is connected to the second external transmission interface 342 through the eighth external transmission interface 642.

The fifth data storage unit 70 includes a sixth internal SAN switch module 72, a seventh internal SAN switch module 74, a sixth storage device 75 and a seventh storage device 76. The sixth internal SAN switch module 72 includes a ninth external transmission interface 722 and a ninth internal transmission interface 724. The seventh internal SAN switch module 74 includes a tenth external transmission interface 742 and a tenth internal transmission interface 744.

The sixth internal SAN switch module 72 is respectively connected to the sixth storage device 75, the seventh storage device 76 and the tenth internal transmission interface 744 through the ninth internal transmission interface 724, and is connected to the third external transmission interface 422 through the ninth external transmission interface 722. The seventh internal SAN switch module 74 is respectively connected to the sixth storage device 75 and the seventh storage device 76 through the tenth internal transmission interface 744, and is connected to the fourth external transmission interface 442 through the tenth external transmission interface 742. Thereby, the redundant data storage system 3 of the invention can expand storage capacity. In particular, the fourth data storage unit 60 and the fifth data storage unit 70 have no storage server module. External instructions of requirement of accessing data are still received and executed by the first storage server module 34 or the second storage server module 44. Moreover, in particular, the fourth data storage unit 60 and the fifth data storage unit 70 both have two internal SAN switch module and two storage devices.

Further, also shown in FIG. 5, the fourth data storage unit 60 also includes a fourth housing 61, a fourth power supply 67 and a fifth power supply 68. The fourth internal SAN switch module 62, the fifth internal SAN switch module 64, the fourth storage device 65, the fifth storage device 66, the fourth power supply 67 and the fifth power supply 68 all are installed in the fourth housing 61. The fourth power supply 67 is respectively connected to the fourth internal SAN switch module 62 and the fourth storage device 65, and supplies electric power to the fourth internal SAN switch module 62 and the fourth storage device 65. The fifth power supply 68 is respectively connected to the fifth internal SAN switch module 64 and the fifth storage device 66, and supplies electric power to the fifth internal SAN switch module 64 and the fifth storage device 66. Further, the fourth data storage unit 60 of the invention also includes a fan and other dissipating devices (not illustrated in FIG. 5) which are installed on the fourth housing 61 and dissipate heat generated by the fourth data storage unit 60 of the invention during operation.

The fifth data storage unit 70 also includes a fifth housing 71, a sixth power supply 77 and a seventh power supply 78. The sixth internal SAN switch module 72, the seventh internal SAN switch module 74, the sixth storage device 75, the seventh storage device 76, the sixth power supply 77 and seventh power supply 78 all are installed in the fifth housing 71. The sixth power supply 77 is respectively connected to the sixth internal SAN switch module 72 and the sixth storage device 75, and supplies electric power to the sixth internal SAN switch module 72 and the sixth storage device 75. The seventh power supply 78 is respectively connected to the seventh internal SAN switch module 74 and the seventh storage device 76, and supplies electric power to the seventh internal SAN switch module 74 and the seventh storage device 76. Further, the fifth data storage unit 70 of the invention also includes a fan and other dissipating device (not illustrated in FIG. 5) which are installed on the fifth housing 71 and dissipate heat generated by the fifth data storage unit 70 of the invention during operation.

If any module in the redundant data storage system 3 of the invention fails, accessing of data still performs normally and whole of the redundant data storage system 3 cannot fail. Therefore, the redundant data storage system 3 of the invention can practice with much reliability. The replacement of the failed modules can finish under the condition of no shutdown and cannot influence operation of other modules. For example, if the first storage server module 34 fails, the second storage server module 44 takes over access of data in the first storage device 36 through the fourth external transmission interface 442, the first external transmission interface 322, the first internal SAN switch module 32 and the first internal transmission interface 324. If the first internal SAN switch module 32 fails, the second storage server module 44 accesses data in the first storage device 36 through the fourth internal transmission interface 444, the third internal transmission interface 424, the second internal SAN switch module 42, the third external transmission interface 422, the second external transmission interface 242, the first storage server module 34 and the second internal transmission interface 244.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A data storage unit, comprising:
an internal storage area network (SAN) switch module, including a first internal transmission interface and a first external transmission interface providing connection for at least one external apparatus;
a storage server module, including a second internal transmission interface and a second external transmission interface providing connection for the at least one device; and
a storage device, wherein the storage server module is respectively connected to the storage device and the first internal transmission interface through the second internal transmission interface, the internal SAN switch module is connected to the storage device through the first internal transmission interface.

2. The data storage unit of claim 1, wherein the internal SAN switch module is implemented into an extension circuit board, and the storage server module is implemented into a main circuit board.

3. The data storage unit of claim 1, further comprising:
a housing; and
a power supply, installed in the housing, and respectively connected to the internal SAN switch module, the storage server module and the storage device, for supplying electric power to the internal SAN switch module, the storage server module and the storage device, wherein the internal SAN switch module, the storage server module and the storage device all are installed in the housing.

4. The data storage unit of claim 1, wherein each of the first external transmission interface and the second external transmission interface is one selected from the group consisting of a fibre channel (FC) interface, a small computer system interface (SCSI), a serial SCSI (SAS), a serial advanced technology attachment (SATA) interface, a peripheral component interconnect express (PCIe) interface, a giga-Ethernet interface, a parallel advanced technology attachment (PATA) interface and an InfiniBand interface, and each of the first internal transmission interface and the second internal transmission interface is one selected from the group consisting of the FC interface, the SCSI, the SAS, the SATA interface, the PCIe interface, the gigs-Ethernet interface, the PATA interface and the InfiniBand interface.

5. The data storage unit of claim 1, wherein the internal SAN switch module detects a first status relative to the storage server module, the storage server module detects a second status relative to the internal SAN switch module, if the first status indicates that the storage server module fails, the internal SAN switch module allows that an external storage server module of the at least one external apparatus, connected to the internal SAN switch module, accesses data in the storage device through the internal SAN switch module.

6. A redundant data storage system, comprising:
a first data storage unit, comprising:
a first internal storage area network (SAN) switch module, comprising a first external transmission interface and a first internal transmission interface;
a first storage server module, comprising a second external transmission interface and a second internal transmission interface; and
a first storage device, wherein the first storage server module is respectively connected to the first storage device and the first internal transmission interface through the second internal transmission interface, the first internal SAN switch module is connected to the first storage device through the first internal transmission interface; and
a second data storage unit, comprising:
a second internal SAN switch module, comprising a third external transmission interface and a third internal transmission interface;
a second storage server module, comprising a fourth external transmission interface and a fourth internal transmission interface; and
a second storage device, wherein the second storage server module is respectively connected to the second storage device and the third internal transmission interface through the fourth internal transmission interface, the second internal SAN switch module is connected to the second storage device through the third internal transmission interface, wherein the second internal SAN switch module is connected to the second external transmission interface through the third external transmission interface, the second storage server module is connected to the first external transmission interface through the fourth external transmission interface.

7. The redundant data storage system of claim 6, wherein the first external transmission interface, the second external transmission interface, the third external transmission interface and the fourth external transmission interface all are one selected from the group consisting of a fibre channel (FC) interface, a small computer system interface (SCSI), a serial SCSI (SAS), a serial advanced technology attachment (SATA) interface, a peripheral component interconnect express (PCIe) interface, a giga-Ethernet interface, a parallel advanced technology attachment (PATA) interface and an InfiniBand interface, the first internal transmission interface, the second internal transmission interface, the third internal transmission interface and the fourth internal transmission interface all are one selected from the group consisting of the FC interface, the SCSI, the SAS, the SATA interface, the PCIe interface, the giga-Ethernet interface, the PATA interface and the InfiniBand interface.

8. The redundant data storage system of claim 6, wherein if the first storage server module fails, the second storage server module takes over access of data in the first storage device through the fourth external transmission interface, the first external transmission interface, the first internal SAN switch module and the first internal transmission interface, if the first internal SAN switch module fails, the second storage server module accesses data in the first storage device through the fourth internal transmission interface, the third internal transmission interface, the second internal SAN switch module, the third external transmission interface, the second external transmission interface, the first storage server module and the second internal transmission interface.

9. The redundant data storage system of claim 6, further comprising:
a third data storage unit, comprising:
a third internal SAN switch module, comprising a fifth external transmission interface and a fifth internal transmission interface;
a third storage server module, comprising a sixth external transmission interface and a sixth internal transmission interface; and
a third storage device, wherein the third storage server module is respectively connected to the third storage device and the fifth internal transmission interface through the sixth internal transmission interface, the third internal SAN switch module is connected to the third storage device through the fifth internal transmission interface, wherein the third internal SAN switch module is respectively connected to the second external transmission interface and the fourth external transmission interface through the fifth external transmission interface, the third storage server module is respectively connected to the first external transmission interface and the third external transmission interface through the sixth external transmission interface.

10. The redundant data storage system of claim 9, wherein each of the first internal SAN switch module, the second internal SAN switch module and the third internal SAN switch module is implemented into an extension circuit board, each of the first storage server module, the second storage server module and the third storage server module is implemented into a main circuit board.

11. The redundant data storage system of claim 9, wherein the first data storage unit also comprises a first housing and a first power supply, the first internal SAN switch module, the first storage server module, the first storage device and the first power supply all are installed in the first housing, the first power supply is respectively connected to the first internal SAN switch module, the first storage server module and the first storage device, and is for supplying electric power to the first internal SAN switch module, the first storage server module and the first storage device, wherein the second data storage unit also comprises a second housing and a second power supply, the second internal SAN switch module, the second storage server module, the second storage device and the second power supply all are installed in the second housing, the second power supply is respectively connected to the second internal SAN switch module, the second storage server module and the second storage device, and is for supplying electric power to the second internal SAN switch module, the second storage server module and the second storage device, wherein the third data storage unit also comprises a third housing and a third power supply, the third internal SAN switch module, the third storage server module, the third storage device and the third power supply all are installed in the third housing, the third power supply is respectively connected to the third internal SAN switch module, the third storage server module and the third storage device, and is for supplying electric power to the third internal SAN switch module, the third storage server module and the third storage device.

12. The redundant data storage system of claim 6, further comprising:

a fourth data storage unit, comprising:
a fourth internal SAN switch module, comprising a seventh external transmission interface and a seventh internal transmission interface;
a fifth internal SAN switch module, comprising an eighth external transmission interface and an eighth internal transmission interface;
a fourth storage device; and
a fifth storage device, wherein the fourth internal SAN switch module is respectively connected to the fourth storage device, the fifth storage device and the eighth internal transmission interface through the seventh internal transmission interface, and is connected to the first external transmission interface through the seventh external transmission interface, wherein the fifth internal SAN switch module is respectively connected to the fourth storage device and the fifth storage device through the eighth internal transmission interface, and is connected to the second external transmission interface through the eighth external transmission interface; and
a fifth data storage unit, comprising:
a sixth internal SAN switch module, comprising a ninth external transmission interface and a ninth internal transmission interface;
a seventh internal SAN switch module, comprising a tenth external transmission interface and a tenth internal transmission interface;
a sixth storage device; and
a seventh storage device, wherein the sixth internal SAN switch module is respectively connected to the sixth storage device, the seventh storage device and the tenth internal transmission interface through the ninth internal transmission interface, and is connected to the third external transmission interface through the ninth external transmission interface, wherein the seventh internal SAN switch module is respectively connected to the sixth storage device and the seventh storage device through the tenth internal transmission interface, and is connected to the fourth external transmission interface through the tenth eternal transmission interface.

13. The redundant data storage system of claim 12, wherein the fourth data storage unit also comprises a fourth housing, a fourth power supply and a fifth power supply, the fourth internal SAN switch module, the fifth internal SAN switch module, the fourth storage device, the fifth storage device, the fourth power supply and the fifth power supply all are installed in the fourth housing, the fourth power supply is respectively connected to the fourth internal SAN switch module and the fourth storage device, and is for supplying electric power to the fourth internal SAN switch module and the fourth storage device, the fifth power supply is respectively connected to the fifth internal SAN switch module and the fifth storage device, and is for supplying electric power to the fifth internal SAN switch module and the fifth storage device, wherein the fifth data storage unit also comprises a fifth housing, a sixth power supply and a seventh power supply, the sixth internal SAN switch module, the seventh internal SAN switch module, the sixth storage device, the seventh storage device, the sixth power supply and the seventh power supply all are installed in the fifth housing, the sixth power supply is respectively connected to the sixth internal SAN switch module and the sixth storage device, and is for supplying electric power to the sixth internal SAN switch module and the sixth storage device, the seventh power supply is respectively connected to the seventh internal SAN switch module and the seventh storage device, and is for supplying electric power to the seventh internal SAN switch module and the seventh storage device.

* * * * *